March 9, 1954 A. KOST 2,671,648
POWER-OPERATED COCKTAIL SHAKER
Original Filed Dec. 27, 1950
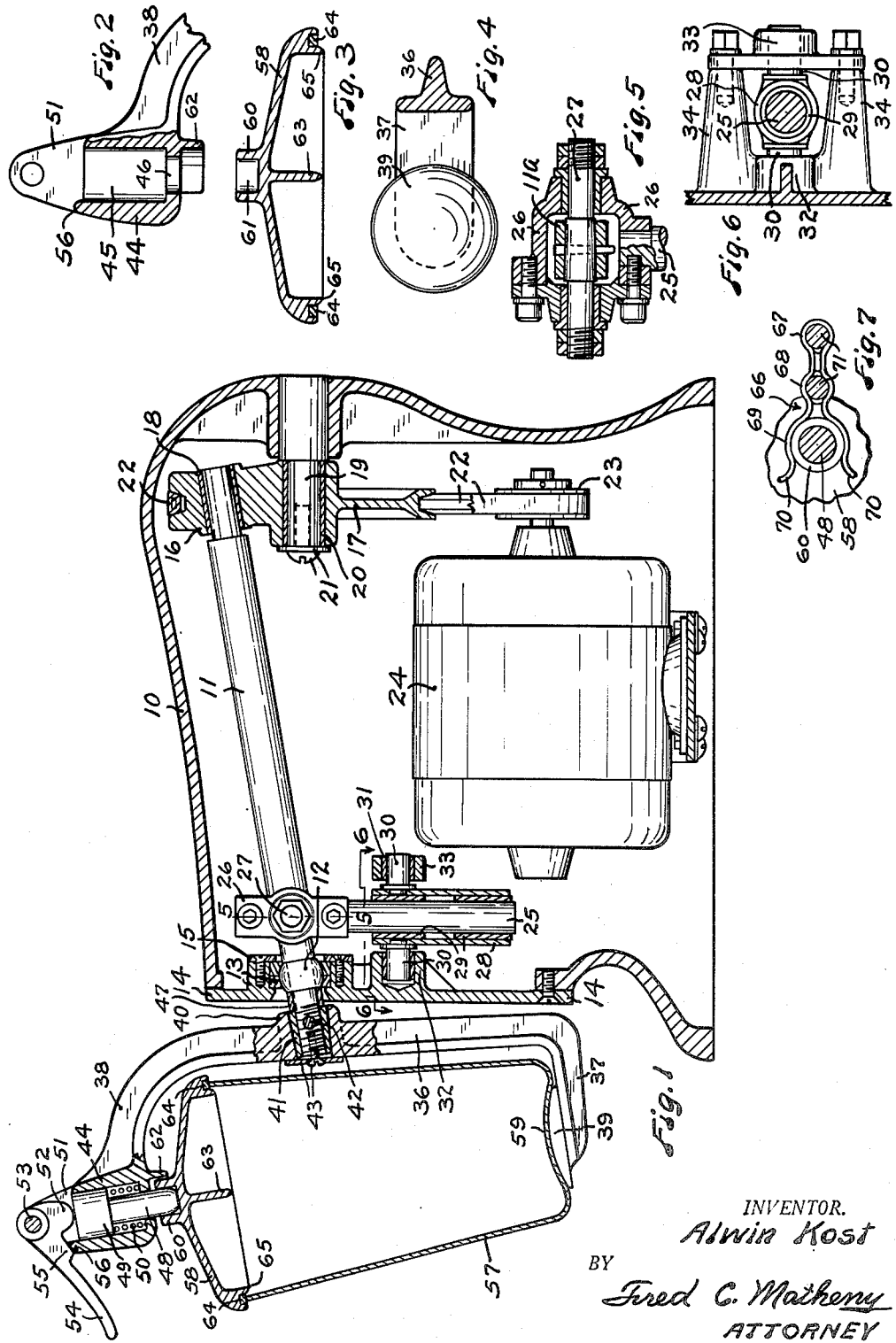
INVENTOR.
Alwin Kost
BY
Fred C. Matheny
ATTORNEY Patented Mar. 9, 1954

2,671,648

UNITED STATES PATENT OFFICE 2,671,648

POWER-OPERATED COCKTAIL SHAKER

Alwin Kost, Portland, Oreg.

Continuation of application Serial No. 202,965, December 27, 1950. This application January 30, 1953, Serial No. 334,119

3 Claims. (Cl. 259—72)

This invention relates to cocktail shakers.

This application is a continuation of my application Serial No. 202,965, filed December 27, 1950, for Power Operated Cocktail Shaker, now abandoned.

The movement imparting means disclosed in this application is similar to that disclosed in my prior Patent No. 2,527,556, issued October 31, 1950. The novel features herein claimed pertain to the liquid receptacle means and the means for receiving and holding said liquid receptacle means during the shaking operation.

An object of this invention is to provide a liquid receptacle of novel and efficient construction together with novel and efficient receptacle receiving and holding means to which the receptacle is readily applied and by which the receptacle is securely held during the shaking and mixing operation and from which the receptacle is readily removed.

Another object is to provide a power operated cocktail shaker which is fast in operation and highly efficient in the mixing of liquids.

Other objects of the invention will be apparent from the following description taken in connection with the accompanying drawings.

In the drawings:

Figure 1 is a vertical sectional view, with parts in elevation showing a cocktail shaker constructed in accordance with this invention.

Fig. 2 is a fragmentary sectional view of the upper end portion of a C-shaped bracket arm embodied in this invention.

Fig. 3 is a detached sectional view of a receptacle cap.

Fig. 4 is a fragmentary plan view with parts in section showing the lower end portion of a C-shaped bracket.

Fig. 5 is a sectional view, with parts in elevation, taken substantially on broken line 5—5 of Fig. 1.

Fig. 6 is a sectional view, with parts in plan, taken substantially on broken line 6—6 of Fig. 1.

Fig. 7 is a view partly in plan and partly in section showing receptacle positioning means of modified form.

Like reference numerals designate like parts throughout the several views of the drawings.

This cocktail shaker comprises a housing 10 having therein a lever 11. The lever 11 carries a ball 12 which is mounted for universal pivotal movement in bearing means 13. The bearing means 13 is carried by the front wall 14 of the housing 10 and a removable cap 15 holds the bearing means in assembled relation on the ball 12. The lever 11 extends out through the front housing wall 14. The ball 12 is fixed on the lever 11 so that the lever is supported for universal pivotal movement and is held against longitudinal movement.

The rear end portion of the lever 10 extends into a socket 16 which is provided in an off center position in a flywheel 17 and this flywheel 17 functions as a crank or crank disc. Preferably a bushing 18 is provided in the socket 16 to receive the rear end of the lever 11. The flywheel 17 is large enough and heavy enough so that its momentum will contribute to the maintenance of a smooth and even speed at all times. The flywheel 17 is rotatively mounted on a fixed bearing pin 19 which is rigid with the frame 10. Preferably a bushing 20 is provided within the hub portion of the flywheel 17 for reception of the bearing pin 19. A cap screw and washer 21 can be used to secure the flywheel 17 on the bearing pin 19. The flywheel 17 is driven by a V belt 22 which passes around said flywheel 17 and around a grooved pulley 23 on the shaft of a motor 24. When the flywheel 17 is rotated it will cause the lever 11 to be moved in conical paths which have their apexes at a common point coinciding with the center of the ball member 12. That is, the two cones described by the axis of the lever 11 will have their tip portions common to the center of the ball member 12. This means that the shorter forward end portion of the lever 11, a part of which extends outwardly through the front wall 14 of the housing 10, will be moved in a conical path. The cocktail shaking means is carried by this forward end portion of lever 11, as hereinafter described.

Means are also provided for oscillating the lever 11 on its own axis at the same time said lever 11 is moved in conical paths. This lever oscillating means, see Figs. 1 and 5, comprises an upright lever oscillating arm or shaft 25 having on its upper end portion a fixed bracket member 26 which is connected with the hub portion 11a of the lever 11 by a cross pin 27. The arm 25 is slidably disposed in a bearing tube 28 and the bearing tube 28 preferably has bushings 29 therein. The arm 25 slides in the bushings 29. Preferably bushings 29 and all other bushings herein described are made of oil impregnated material.

The bearing tube 28 has two oppositely protruding bearing pins 30 fixed thereto and extending in opposite radial directions therefrom. The bearing pins 30 are journaled in bushings 31 which are carried by bearing members 32 and 33, Fig. 6, and the bearing member 33 is supported by rigid frame posts 34.

When the lever 11 is moved in conical paths the upright shaft 25 will be slidably moved in the bearing tube 28 and will be angularly moved back and forth about the common axis of the bearing pins 30 and in a path parallel to the front housing wall 14. Thus the angular movement of the shaft 25 will impart to the lever 11 a back and forth oscillating movement about the axis of said lever 11.

The parts hereinbefore described constitute means for supporting and imparting movement to a receptacle holding bracket and to a receptacle, both of which are of special construction in accordance with this invention.

The receptacle holding bracket is shaped somewhat like a letter C and comprises an approximately upright main bracket arm 36, a lower bracket arm 37 rigid with the lower end of the main bracket arm 36 and extending perpendicularly thereto and a curved upper bracket arm 38 rigid with the upper end portion of the main bracket arm 36 and extending transversely therefrom.

The bracket arms 36, 37 and 38 are all disposed in a common plane and the lower arm 37 and upper arm 38 are in opposed spaced apart relation. Preferably these three arms 36, 37 and 38 are of T shape in cross section, as best shown in Fig. 4.

About midway of its length the main bracket arm 36 is provided with an integral tubular hub or boss 40 which receives and is rigidly secured to the outwardly protruding forward end portion of the lever arm 11. Preferably the forwardly protruding end portion of the lever arm 11 is threaded and is screwed into a tapered sleeve 41. The sleeve 41 jams against another sleeve 47 on lever arm 11 and the other sleeve 47 jams against the ball 12 and securely holds the ball 12 against a shoulder on the lever arm 11. The tapered sleeve 41 fits tightly into a suitably tapered opening in the tubular hub 40 of the main bracket arm 36 and a cross pin 42 extends through the hub 40 and tapered sleeve 41 and lever arm 11 and secures all of these parts together in assembled relation. Washer and screw means 43 are used to provide a closure for the opening on the forward side of the bracket arm 36 at the location of the hub 40. The C-shaped bracket 36, 37, 38 being in a vertical plane is at right angles to the axis of the pin 27.

Obviously conical movement of the shorter outwardly protruding end portion of the lever 11 will impart a wobbling or gyratory or swash plate movement to the C-shaped bracket. At the same time the oscillatory movement on its own axis which is imparted to the lever 11 by the upright arm 25 and connected parts will rock the C-shaped bracket from side to side. Thus a complex movement which is highly efficient in mixing liquids is imparted to the C-shaped bracket.

The lower bracket arm 37 has a bearing and centering member 39 rigidly secured to its top side and the upper surface of this member 39 is spherical in shape, as shown in Figs. 1 and 4.

The upper bracket arm 38 is shaped to form a boss or hub 44 which has an upright opening or socket 45 of substantial depth provided therein. The socket 45 is open at its upper end and has a coaxial hole 46 of smaller diameter than the recess at the bottom thereof. Vertically movable locking pin means comprising a locking pin 48 and an integral head 49 of larger diameter than the pin 48 is operatively disposed within the socket 45 and hole 46 with the pin 48 protruding downwardly through the hole 46. A compression spring 50 is interposed between the head 49 and the bottom of the socket 45 to yieldingly urge the pin 48 and head 49 upwardly. Two spaced apart upwardly extending bearing lugs 51 are integral with the boss 44 and extend upwardly therefrom. A cam 52 is operatively disposed between the bearing lugs 51 and pivotally connected with said lugs 51 by a transverse pivot pin 53. A manually operated cam lever 54 is integral with the cam 52 and has a stop lug 55 thereon which is adapted to engage with a stop shoulder 56 on the upper end portion of hub 44.

The spring 50 holds the upper end of the head 49 in contact with the cam 52 and said cam cooperates with the spring 50 to control the vertical movement of the pin 48. When the cam lever 54 and cam 52 are in the position shown in Fig. 1 the line of pressure of the pin and head means 48, 49 against the cam 52 is to the right of a plane which is common to the axis of pivot pin 53 and to the axis of pin and head means 48, 49 and the pin and head means 48, 49 is locked in a down position. In this position it will securely hold receptacle and cap means of a form hereinafter described.

A receptacle 57 and cover or cap 58 therefor, both of which are of novel construction, are especially designed to cooperate with and be held by the C-shaped bracket and parts associated therewith and just described. The receptacle 57 has an upwardly concave bottom end portion 59 which is adapted to fit over and rest upon and be held by the spherically convex member 39 on the lower bracket arm 37. The convex bearing member 39 and cooperating portion 59 of the receptacle 57 are of large area and are self centering and allow for easy application and removal of the receptacle 57 to the bracket 36, 37, 38. The cap 58 has a centrally positioned upwardly extending boss 60 which is provided with a recess or socket 61 adapted to receive the lower end portion of the pin 48. The lower end portion of said pin 48 is preferably rounded slightly, as shown in Fig. 1, so that it will enter the recess 61 even if said recess is not exactly centered.

A guide or centering member 62 of approximately U shape is provided on the lower side of the upper bracket arm 68. The guide member 62 is open at the front end and extends around the hole 46 through which the pin 48 protrudes and said guide member 62 is adapted to receive the boss 60 on the cap 58 and to position said boss 60 for the reception of the pin 48.

The cap 58 is of inverted dish shape and preferably has one or more ribs 63 on its under side to provide strength. The circumferential portion of this cap has an annular groove wherein is disposed an annular resilient sealing ring 64. The sealing ring 64 is positioned so that it will make contact with the annular upper edge portion of the receptacle 57. An annular flange 65 on the cap 58 inwardly from the sealing ring 64 extends below the plane of the bottom face of the sealing ring 64 and helps to properly center the cap 58 on the receptacle 57.

Fig. 7 shows an alternative guide and centering means for centering the boss 60 of the cap 58. When the guide means shown in Fig. 7 is to be used the guide member 62 is omitted or removed from the bracket arm 38 and is replaced by the centering means shown in Fig. 7. This centering means of Fig. 7 comprises a flat metal spring member 66 of clothes pin shape having screw receiving rounded portions 67 and 68 and secured to the under side of the upper bracket arm 36 by screws 71. A rounded boss receiving portion 69 having flared tips 70 is positioned in alignment with the hole 46 through which the pin 48 protrudes and is adapted to receive and resiliently engage the boss 60 on the upper end of the cap 58. The part 69 will spring outwardly when the boss 60 is pressed against the divergent tip portions 70 and will yieldingly grip and hold the boss 60 but will release said boss easily if a pull is exerted on the receptacle 57. This Fig. 7 structure thus permits a receptacle 57 with a cap 58 thereon to be applied to and removed from the bracket by which it is held with only one hand because the container will be held in position within the bracket by the part 69 while the locking pin is being moved downwardly into the socket 61 and will be similarly held after the locking pin 48 has been moved upwardly out of the socket 61 preparatory to removing the receptacle 57 from the bracket.

The receptacle 57 with cap 58 thereon is very quickly and easily engaged within or removed from the bracket means by which it is held. The complex movement which is imparted to the receptacle 57 is highly efficient in mixing any liquid which may be within the receptacle. All working parts of the machine are fully housed in a neat and attractive housing and the bracket and receptacle parts are readily accessible and easily cleaned.

The foregoing description and accompanying drawings clearly disclose what I now regard as a preferred embodiment of this invention but it will be understood that this disclosure is merely illustrative and that changes may be made within the scope of the following claims.

I claim:

1. A cocktail shaker comprising an approximately C-shaped bracket supported for shaking movement in a generally upright position, said C-shaped bracket having an upright main bracket arm and having an upper bracket arm and a lower bracket arm rigid with the respective upper and lower end portions of said main bracket arm and extending forwardly therefrom, all of said bracket arms being in a common plane; an upwardly extending spherically convex receptacle supporting member rigid with the upper side of the lower bracket arm; a hub rigid with the upper bracket arm and positioned in axial alignment with said convex receptacle supporting member, said hub having therein a socket which is open at the top end and which has a hole of smaller diameter than the socket at the lower end thereof; locking pin means having a head portion fitting said socket and movable in said socket and having a pin portion of smaller diameter than the head portion protruding downwardly through said hole; a spring in the socket urging said locking pin means upwardly; spaced apart lugs rigid with said hub and extending upwardly therefrom; a cam pivotally mounted between said lugs adapted to move said locking pin means downwardly and to hold the same in a lowered position; an operating lever on said cam; a receptacle having in its bottom wall an upwardly extending spherically concave recess adapted to fit over said upwardly extending convex receptacle supporting member; and a cap on said receptacle having a centrally positioned recess adapted to receive said pin.

2. A cocktail shaker for use with a receptacle having a removable cap and having axial recesses in the cap and in the receptacle bottom comprising an approximately C-shaped one piece integral bracket supported for shaking movement in a generally upright position; an upwardly extending member rigid with the lower arm of said bracket adapted to fit within the recess in the receptacle bottom; a hub rigid with the upper arm of said bracket and positioned in axial alignment with said member of said lower bracket which engages within the recess in the receptacle bottom, said hub having therein a socket which is open at the top end and which has a hole of smaller diameter than the socket at the lower end thereof; locking pin means having a head portion movably fitting within said socket and having a pin portion protruding downwardly through said hole and adapted to be positioned within the axial recess in the receptacle top; a spring in the socket urging said locking pin upwardly; spaced apart lugs rigid with said hub and extending upwardly therefrom; a cam pivotally mounted between said lugs adapted to move said locking means downwardly and to lock the same in a lowered position; and a manually operated lever rigid with said cam.

3. A cocktail shaker comprising an approximately C-shaped one piece bracket supported for shaking movement in a generally upright position, said C-shaped bracket having an upright main bracket arm and an upper bracket arm and a lower bracket arm rigid with the respective upper and lower end portions of said main bracket arm and extending forwardly therefrom; an upwardly extending convex receptacle supporting member rigid with the upper side of the lower bracket arm; a receptacle having in its bottom wall an upwardly extending external concave recess adapted to fit over and rest upon said convex receptacle supporting member; a removable cap on said receptacle; an upwardly extending centrally positioned boss on said cap provided with an upwardly opening axial recess; a pin movably supported by the upper bracket arm and aligned with said convex receptacle supporting member and movable longitudinally into and out of the recess in said upwardly extending boss; and a downwardly extending boss receiving member of approximately U shaped cross section rigid with the under side of the upper bracket arm and positioned coaxially of said pin and opening in a forward direction, whereby it will receive the boss on the cap member and cooperate in the centering and supporting of the boss and the cap and the receptacle.

ALWIN KOST.

References Cited in the file of this patent

UNITED STATES PATENTS

| Number | Name | Date |
| --- | --- | --- |
| 777,408 | Fletcher | Dec. 13, 1904 |
| 1,020,806 | Devine | Mar. 19, 1912 |
| 1,188,817 | Outlaw | June 27, 1916 |
| 1,242,218 | McCann | Oct. 9, 1917 |
| 1,292,127 | Stevens | Jan. 21, 1919 |
| 1,549,155 | Schwab et al. | Aug. 11, 1925 |
| 1,643,847 | Hallum et al. | Sept. 27, 1927 |
| 2,059,572 | Flynt | Nov. 3, 1936 |
| 2,194,138 | Crawford | Mar. 19, 1940 |
| 2,527,556 | Kast | Oct. 31, 1950 |